US012808787B2

(12) United States Patent
Araki et al.

(10) Patent No.: US 12,808,787 B2
(45) Date of Patent: Nov. 24, 2026

(54) FOURIER TRANSFORM INFRARED SPECTROPHOTOMETER

(71) Applicant: SHIMADZU CORPORATION, Kyoto (JP)

(72) Inventors: Takahisa Araki, Kyoto (JP); Shinya Wakuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 261 days.

(21) Appl. No.: 18/690,789

(22) PCT Filed: Mar. 23, 2022

(86) PCT No.: PCT/JP2022/013506
§ 371 (c)(1),
(2) Date: May 14, 2024

(87) PCT Pub. No.: WO2023/042454
PCT Pub. Date: Mar. 23, 2023

(65) Prior Publication Data

US 2024/0385105 A1 Nov. 21, 2024

(30) Foreign Application Priority Data

Sep. 14, 2021 (JP) ................................ 2021-149092

(51) Int. Cl.
*G01N 21/25* (2006.01)
*G01J 3/02* (2006.01)
(Continued)

(52) U.S. Cl.
CPC .......... *G01N 21/255* (2013.01); *G01J 3/0202* (2013.01); *G01J 3/0286* (2013.01);
(Continued)

(58) Field of Classification Search
CPC ................ G01N 21/255; G01N 21/35; G01N 2021/3595; G01J 3/0291; G01J 3/0202; G01J 3/0286; G01J 3/108; G01J 3/4535
See application file for complete search history.

(56) References Cited

U.S. PATENT DOCUMENTS 5,153,675 A * 10/1992 Beauchaine ......... G02B 7/1822 250/339.08
5,406,090 A * 4/1995 Mattson .................. H01K 7/00 250/493.1
(Continued)

FOREIGN PATENT DOCUMENTS

CN 203572578 U 4/2014
CN 109696245 A 4/2019
(Continued)

OTHER PUBLICATIONS

English machine translation of JPH02102424A (Year: 1990).*
(Continued)

*Primary Examiner* — Dominic J Bologna
(74) *Attorney, Agent, or Firm* — Renner, Otto, Boisselle & Sklar, LLP

(57) ABSTRACT

Provided is a Fourier transform infrared spectrophotometer configured to hinder, to a greater extent, heat transfer from an infrared light source to an interferometer. The Fourier transform infrared spectrophotometer includes: an infrared light source that emits infrared light; an interferometer that includes a beam splitter, a fixed mirror, and a moving mirror, and generates interference light from the infrared light; and a base plate including a first portion where the infrared light source is located and a second portion where the interferometer is located. The base plate has a shape forming a predetermined angle between the first portion and the second portion.

7 Claims, 7 Drawing Sheets

(51) Int. Cl.
*G01J 3/10* (2006.01)
*G01J 3/453* (2006.01)
*G01N 21/35* (2014.01)

(52) U.S. Cl.
CPC ............. *G01J 3/0291* (2013.01); *G01J 3/108* (2013.01); *G01J 3/4535* (2013.01); *G01N 21/35* (2013.01); *G01N 2021/3595* (2013.01)

(56) References Cited

U.S. PATENT DOCUMENTS

| | | | | |
|---|---|---|---|---|
| 2005/0151082 | A1 | 7/2005 | Coffin et al. | |
| 2010/0243902 | A1* | 9/2010 | Wada | G01N 21/35 250/339.08 |
| 2014/0175288 | A1* | 6/2014 | Ressler | G01B 9/02015 356/450 |
| 2018/0113026 | A1 | 4/2018 | Kamikake | |
| 2021/0072078 | A1 | 3/2021 | Kojima | |

FOREIGN PATENT DOCUMENTS

| | | | |
|---|---|---|---|
| JP | H02102424 | A * | 4/1990 |
| JP | 10-090060 | A | 4/1998 |
| JP | H10-206125 | A | 8/1998 |
| JP | H11-264764 | A | 9/1999 |
| JP | 2003149133 | A * | 5/2003 |
| JP | 3113903 | U | 9/2005 |
| JP | 2012-007964 | A | 1/2012 |
| JP | 2012-078279 | A | 4/2012 |
| JP | 2014-126518 | A | 7/2014 |
| JP | 2014-526686 | A | 10/2014 |
| JP | 3224066 | A | 11/2019 |
| WO | 2012/073681 | A1 | 6/2012 |
| WO | 2013/036927 | A1 | 3/2013 |
| WO | 2016/166872 | A1 | 10/2016 |

OTHER PUBLICATIONS

English machine translation of JP2003149133A (Year: 2003).*
Japanese Office Action dated Nov. 5, 2024 corresponding to Japanese Patent Application No. 2023-548114, with Machine Translation.
Extended European Search Report corresponding to counterpart European patent application No. 22869606.8 dated Jul. 28, 2025.
Japanese Office Action corresponding to counterpart Japanese patent application No. 2023-548114 dated Mar. 3, 2025, with English translation.
Written Opinion for corresponding Application No. PCT/JP2022/013506, mailed May 31, 2022.

* cited by examiner

FOURIER TRANSFORM INFRARED SPECTROPHOTOMETER

TECHNICAL FIELD

The present disclosure relates to a Fourier transform infrared spectrophotometer.

BACKGROUND ART

Conventionally, in a Fourier transform infrared spectrophotometer (FT-IR), an infrared light source and an interferometer are arranged on a two-dimensional plane of a base plate, as shown in Japanese Utility Model Registration No. 3113903 (PTL 1). The Fourier transform infrared spectrophotometer introduces infrared light emitted from the infrared light source disposed on the base plate into the interferometer to analyze a sample placed in a sample chamber.

CITATION LIST

Patent Literature

PTL 1: Japanese Utility Model Registration No. 3113903

SUMMARY OF INVENTION

Technical Problem

The infrared light source emits heat while emitting infrared light, and the heat transferred to the interferometer may cause thermal expansion of optical elements such as beam splitter constituting the interferometer as well as thermal expansion of its bolder, and thereby cause change of the optical axis, resulting in deterioration of the measurement accuracy. To address this, the Fourier transform infrared spectrophotometer is required to take measures against heat transfer, by providing a heater cover to prevent heat from the infrared light source from being transferred to the interferometer, and/or using a high-thermal-conductivity material for the base on which the infrared light source and the interferometer are arranged, so that heat is transferred away from the interferometer.

An object of the present disclosure is to provide a Fourier transform infrared spectrophotometer configured to hinder, to a greater extent, heat transfer from an infrared light source to an interferometer.

Solution to Problem

A Fourier transform infrared spectrophotometer of the present disclosure includes: an infrared light source that emits infrared light; an interferometer that includes a beam splitter, a fixed mirror, and a moving mirror, and generates interference light from the infrared light; and a base plate including a first portion where the infrared light source is located and a second portion where the interferometer is located, and the base plate has a shape forming a predetermined angle between the first portion and the second portion.

Advantageous Effects of Invention

The Fourier transform infrared spectrophotometer of the present disclosure is configured to enable hindrance, to a greater extent, of heat transfer from the infrared light source to the interferometer.

DESCRIPTION OF EMBODIMENTS

Figure 1:
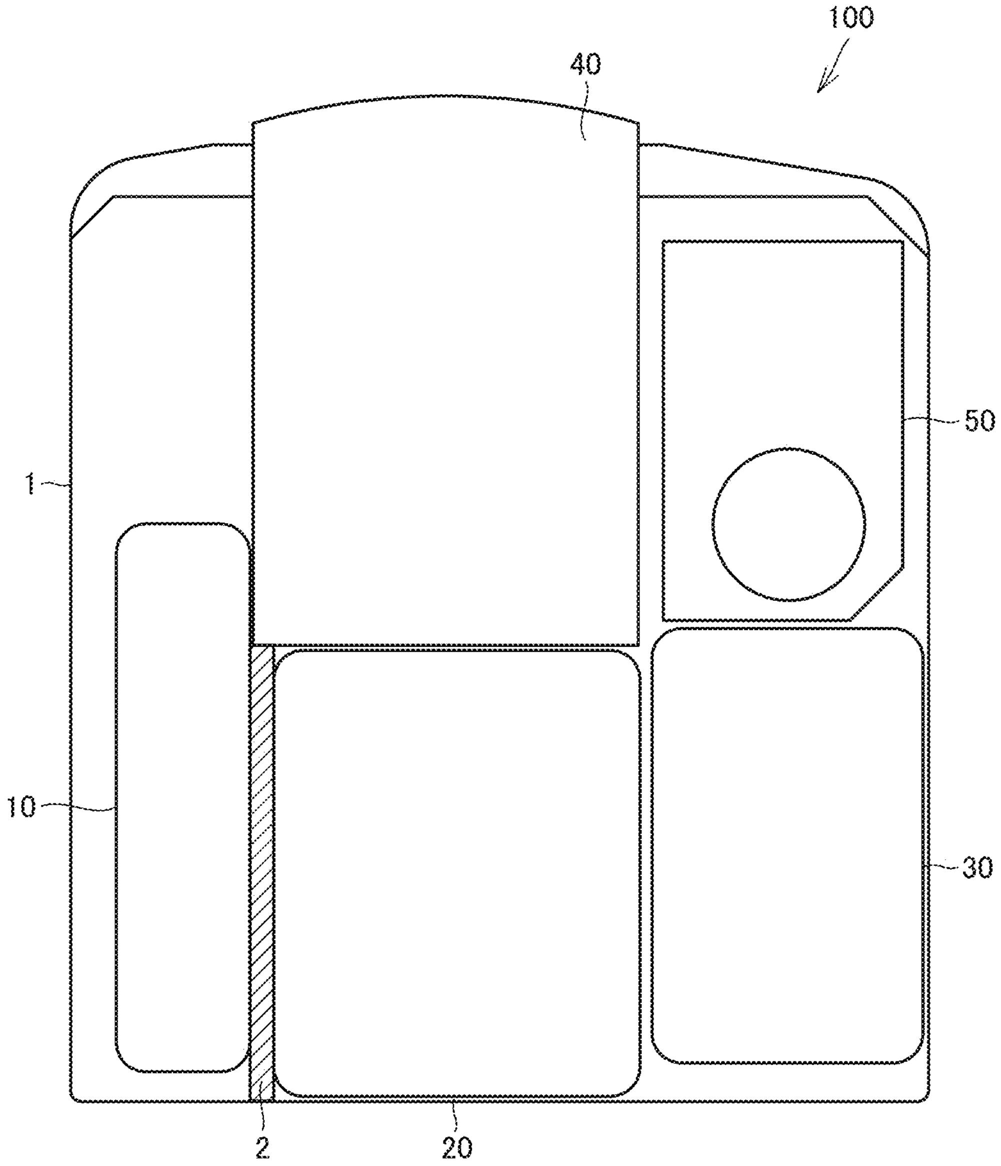
FIG. 1 is a schematic diagram of a Fourier transform infrared spectrophotometer according to an embodiment.

In the following, an embodiment of the present disclosure is described. The same parts are denoted by the same reference characters, and a description thereof is not herein repeated.

Figure 2:
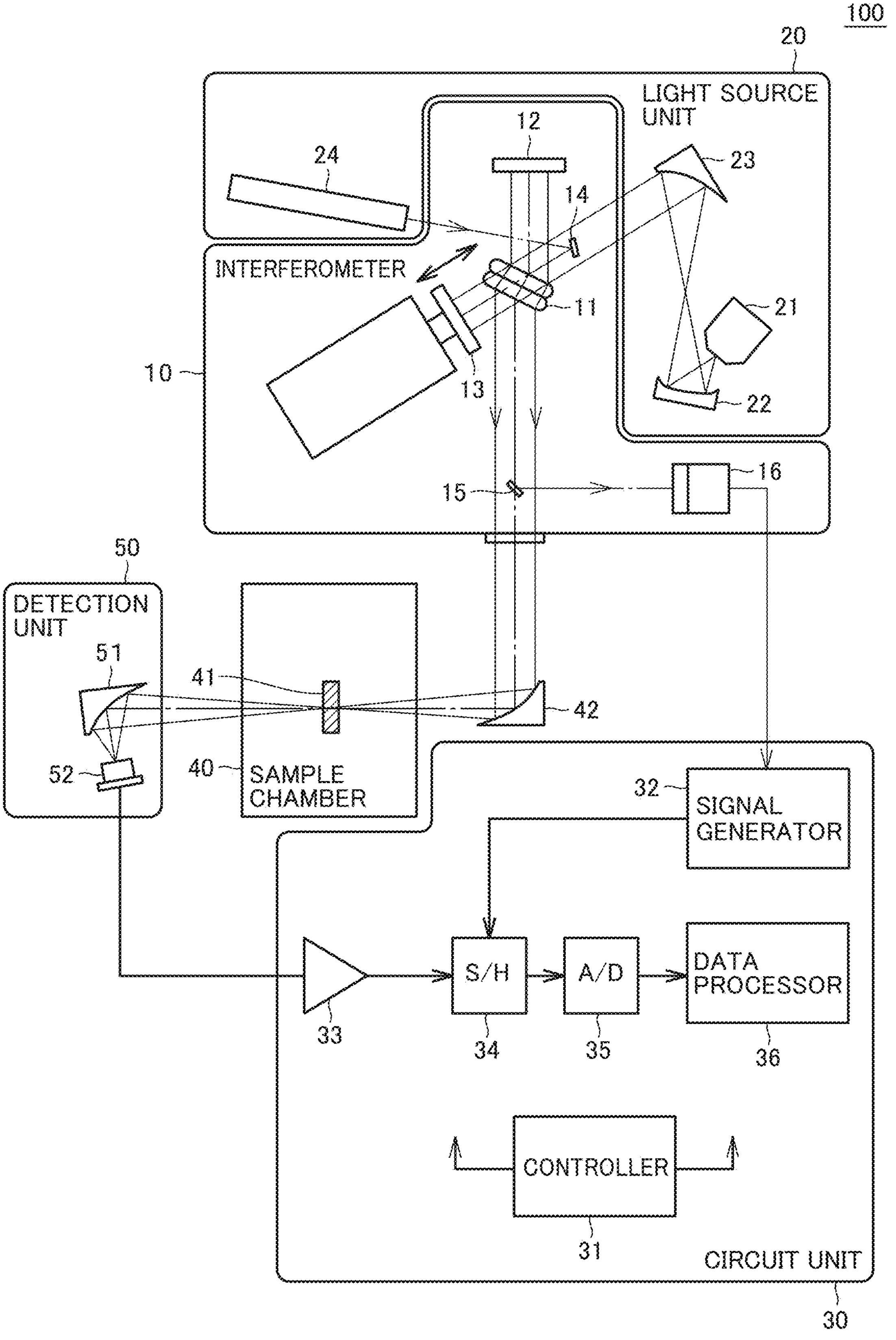
FIG. 2 is a block diagram of the Fourier transform infrared spectrophotometer according to the embodiment.

Referring to FIGS. 1 and 2, a Fourier transform infrared spectrophotometer 100 according to an embodiment is described. FIG. 1 is a schematic diagram of Fourier transform infrared spectrophotometer 100 according to an embodiment. FIG. 2 is a block diagram of Fourier transform infrared spectrophotometer 100 according to the embodiment. Fourier transform infrared spectrophotometer 100 includes an interferometer 10, a light source unit 20, a circuit unit 30, a sample chamber 40, and a detection unit 50. FIG. 1 shows a plan view of Fourier transform infrared spectrophotometer 100 as seen from above, and illustrates an arrangement, in a housing 1, of interferometer 10, light source unit 20, circuit unit 30, sample chamber 40, and detection unit 50.

The upper side of FIG. 1 is the front side of Fourier transform infrared spectrophotometer 100, and the lower side of FIG. 1 is the rear side of Fourier transform infrared spectrophotometer 100. Interferometer 10, light source unit 20, and circuit unit 30 are arranged on the rear side of Fourier transform infrared spectrophotometer 100, and interferometer 10, light source unit 20, and circuit unit 30 are arranged side by side in this order from the left side of FIG. 1. Interferometer 10 is attached to one portion of a base plate 2 in an L shape, which is described later herein, and light source unit 20 is attached to another portion of base plate 2.

Sample chamber 40 and detection unit 50 are arranged on the front side of Fourier transform infrared spectrophotometer 100, and sample chamber 40 and detection unit 50 are arranged side by side in this order from the left side of FIG. 1. Sample chamber 40 is covered with a lid member, and the lid member is opened to set, in sample chamber 40, a sample to be measured.

With reference to FIG. 2, a specific configuration of Fourier transform infrared spectrophotometer 100 is described. Interferometer 10 includes a beam splitter 11, a fixed mirror 12, and a moving mirror 13, for example, and light source unit 20 includes an infrared light source 21, a condenser mirror 22, and a collimator mirror 23, for example. Interferometer 10 and light source unit 20 generate infrared interference light for performing spectrum measurement. Specifically, infrared light emitted from infrared light source 21 is transmitted to beam splitter 11 via condenser mirror 22 and collimator mirror 23, and split in two directions, i.e., the direction toward fixed mirror 12 and the direction toward moving mirror 13.

The light reflected from fixed mirror 12 and the light reflected from moving mirror 13 are recombined by beam splitter 11 and transmitted through an optical path directed toward a parabolic mirror 42. Moving mirror 13 reciprocates back and forth (in the directions of the arrowheads in FIG. 2), and therefore, the light generated by the recombination is transformed into interference light (interferogram) with its amplitude varying with time. The light collected by parabolic mirror 42 is transmitted into sample chamber 40, and the light passing through a sample 41 placed in sample chamber 40 enters detection unit 50. The light having entered detection unit 50 is focused on a photodetector 52 by an ellipsoidal mirror 51.

Fourier transform infrared spectrophotometer 100 includes a main interferometer for obtaining an interferogram and a control interferometer for controlling the sliding speed of moving mirror 13 and/or generating a timing signal for sampling a signal obtained from a detector of the main interferometer. The control interferometer is constituted of a laser light source 24, a mirror 14, beam splitter 11, fixed mirror 12, and moving mirror 13, for example, and generates laser interference light for obtaining an interference pattern signal. Specifically, light emitted from laser light source 24 is transmitted to beam splitter 11 via mirror 14, transformed into interference light, like the aforementioned infrared light, and transmitted toward parabolic mirror 42. Since the laser interference light travels as a light flux having a very small diameter, the laser interference light is reflected by a mirror 15 inserted in the optical path and then introduced into a photodetector 16.

Optical components including interferometer 10 serving as a main component are disposed in an airtight chamber in which the humidity is controlled. This is mainly for protecting optical components such as beam splitter 11 in which deliquescent KBr is used as a substrate.

The received light signal of photodetector 16, that is, the laser light interference pattern signal is input to a signal generator 32 where a pulse signal for sampling the received light signal with respect to the infrared interference light is generated. The received light signal obtained by photodetector 52 is amplified by an amplifier 33, sampled by a sample-and-hold circuit (S/H) 34 at a timing determined by the pulse signal, and then converted into digital data by an A/D converter (A/D) 35. A data processor 36 performs Fourier transform on this data to generate an absorption spectrum, and further generates a transmittance spectrum using background data. A series of measurement operations is executed under control by a controller 31. Controller 31, signal generator 32, amplifier 33, sample-and-hold circuit (S/H) 34, A/D converter (A/D) 35, and data processor 36 are included in circuit unit 30.

Infrared light source 21 emits heat while emitting infrared light, and the heat transferred to interferometer 10 may cause change of an optical axis passing through beam splitter 11 and other optical elements constituting interferometer 10, to thereby deteriorate the measurement accuracy. Therefore, in Fourier transform infrared spectrophotometer 100, interferometer 10 and infrared light source 21 are arranged in such a manner that hinders heat transfer from infrared light source 21 to interferometer 10. In the following, the arrangement of interferometer 10 and infrared light source 21 is described with reference to the drawings.

Figure 3:
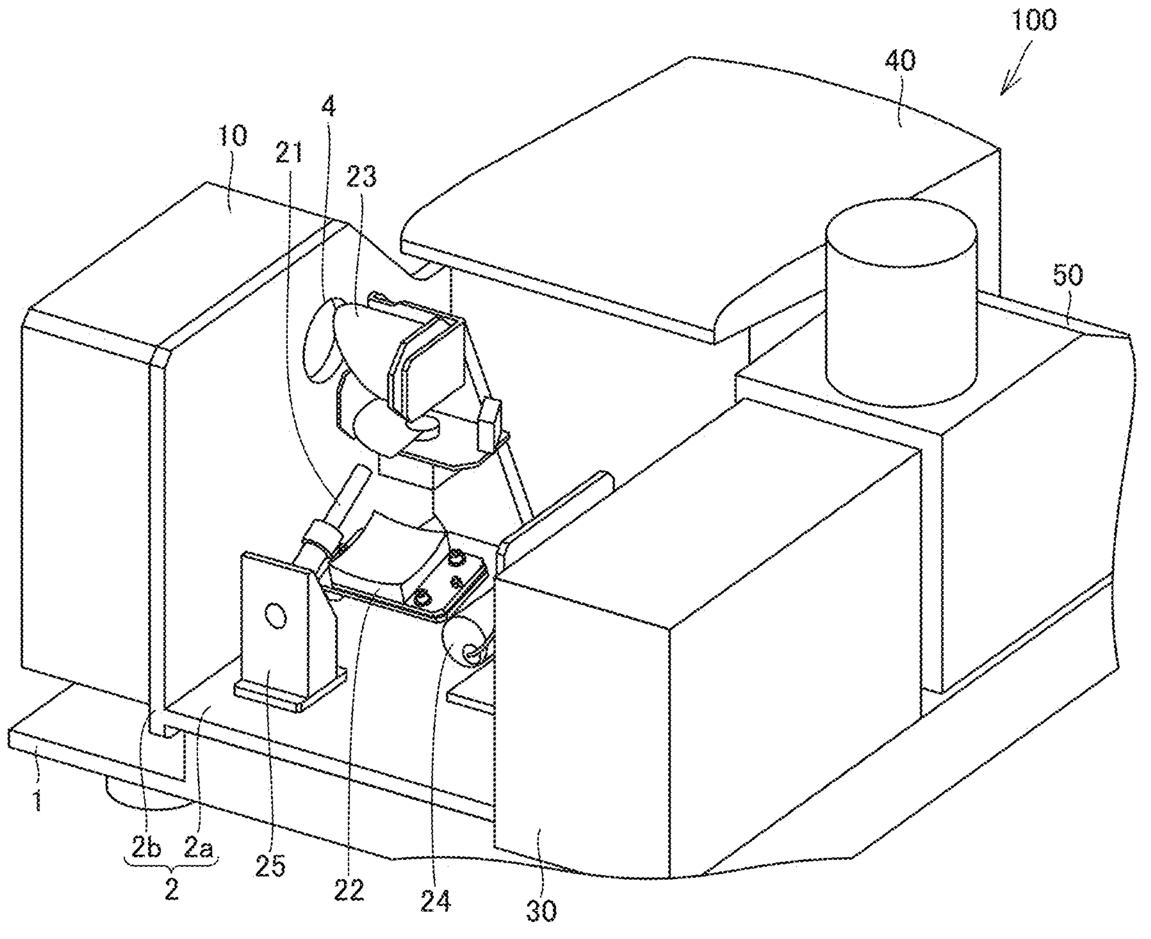
FIG. 3 is a perspective view for illustrating the inside of the Fourier transform infrared spectrophotometer according to the embodiment.
Figure 4:
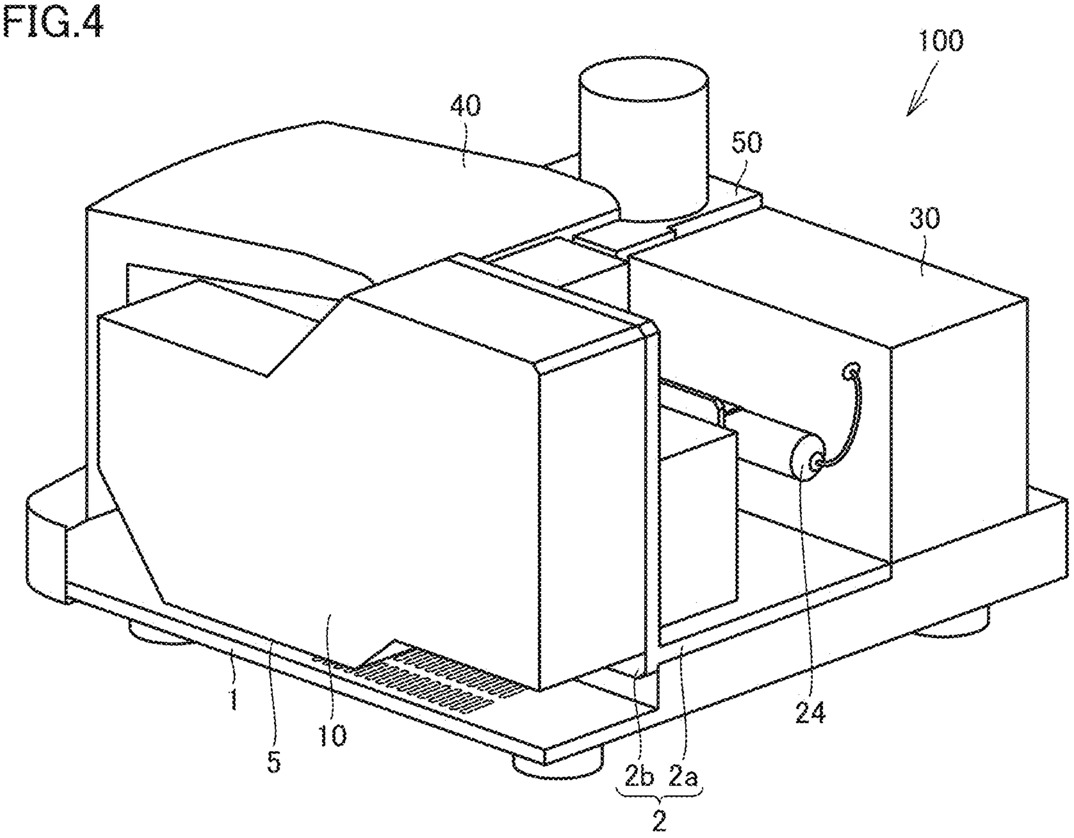
FIG. 4 is a perspective view at another angle for illustrating the inside of the Fourier transform infrared spectrophotometer according to the embodiment.

FIG. 3 is a perspective view for illustrating the inside of Fourier transform infrared spectrophotometer 100 according to the embodiment. FIG. 4 is a perspective view at another angle for illustrating the inside of the Fourier transform infrared spectrophotometer according to the embodiment. As described above, interferometer 10 and light source unit 20 need to generate infrared interference light, and are therefore required to have high positional accuracy. As such, in the conventional Fourier transform infrared spectrophotometer, an infrared light source and an interferometer are arranged on a two-dimensional plane of a base plate.

In contrast, in Fourier transform infrared spectrophotometer 100 according to the present embodiment, infrared light source 21 and interferometer 10 are arranged on L-shaped base plate 2, instead of the two-dimensional plane of the base plate. L-shaped base plate 2 includes a first portion 2*a* provided horizontally with respect to an installation surface on which Fourier transform infrared spectrophotometer 100 is installed, and a second portion 2*b* provided vertically with respect to the installation surface.

First portion 2*a* is provided horizontally with respect to the installation surface of Fourier transform infrared spectrophotometer 100, and its surface facing the installation surface is the lower surface and its surface opposite to the installation surface is the upper surface. Infrared light source 21 is disposed on the upper surface of first portion 2*a*. Specifically, as shown in FIG. 3, infrared light source 21 is disposed on the upper surface of first portion 2*a* with a holding block 25 interposed between the infrared light source and the upper surface. In the space on the upper surface of first portion 2*a*, light source unit 20 such as condenser mirror 22, collimator mirror 23, and laser light source 24 is disposed, in addition to infrared light source 21.

Second portion 2*b* is provided perpendicularly with respect to the installation surface of Fourier transform infrared spectrophotometer 100, and its surface abutting against first portion 2*a* is the inner surface and its surface opposite to the inner surface is the outer surface. Interferometer 10 is disposed on the outer surface of second portion 2*b*.

Therefore, infrared light emitted from infrared light source 21 is reflected by condenser mirror 22 located below infrared light source 21, and is introduced into interferometer 10 by collimator mirror 23 located above condenser mirror 22. A window 4 is provided in second portion 2*b* for allowing light from collimator mirror 23 to be introduced into interferometer 10. As shown in FIG. 3, condenser mirror 22 and collimator mirror 23 are fixed to the inner surface of second portion 2*b*.

Infrared light source 21 disposed on the upper surface of first portion 2*a* is thus located on the inner surface side of second portion 2*b*. Therefore, interferometer 10 disposed on the outer surface of second portion 2*b* is located on the opposite side to infrared light source 21 with respect to second portion 2*b*, and heat emitted from infrared light source 21 is never transferred directly to interferometer 10, except that necessary light is introduced into interferometer 10 from window 4. In particular, as shown in FIG. 4, interferometer 10 is covered with a cover member 5 made from a resin material, for example, in order to ensure airtightness, and therefore, a heat dissipation structure is difficult to employ for the interferometer. Cover member 5 can be made from a resin material to reduce the weight of Fourier transform infrared spectrophotometer 100. Cover member 5 is not limited to the resin material but may be a metal material.

Since base plate 2 is L-shaped, heat emitted from infrared light source 21 can be blocked by second portion 2*b*. That is, the section where interferometer 10 is located for which a heat dissipation structure is difficult to employ and the section where light source unit 20 is located for which a heat dissipation structure is easily employed can be separated from each other by second portion 2*b*.

Thus, base plate 2 can be shaped in such a manner that provides the three-dimensional arrangement in which heat emitted from infrared light source 21 is not directly transferred to interferometer 10 while a high positional accuracy is ensured. Further, as compared with the case where infrared light source 21 and interferometer 10 are arranged on a two-dimensional plane, the degree of freedom of the arrangement of infrared light source 21 and interferometer 10 is increased, which can also contribute to further compactness of Fourier transform infrared spectrophotometer 100.

The shape of base plate 2 is described above as an L-shape that forms an angle of approximately 90° between first portion 2*a* and second portion 2*b*. However, the shape of base plate 2 is not limited to the L shape, and may be any shape as long as first portion 2*a* and second portion 2*b* form a predetermined angle. The predetermined angle may be any angle other than an angle (180° for example) at which first portion 2*a* and second portion 2*b* are horizontal.

Preferably, base plate 2 has a one-piece structure into which first portion 2*a* and second portion 2*b* are integrated. The one-piece structure of base plate 2 provides higher relative positional accuracy of infrared light source 21 and interferometer 10 arranged on base plate 2. As long as the relative positional accuracy of infrared light source 21 and interferometer 10 that are necessary for the measurement can be ensured, first portion 2*a* and second portion 2*b* may respectively be separate structures. Further, a material having a higher thermal conductivity may be used for first portion 2*a* where infrared light source 21 is disposed, than the thermal conductivity of a material used for second portion 2*b*, so that heat from infrared light source 21 is easily dissipated from first portion 2*a*.

Figure 5:
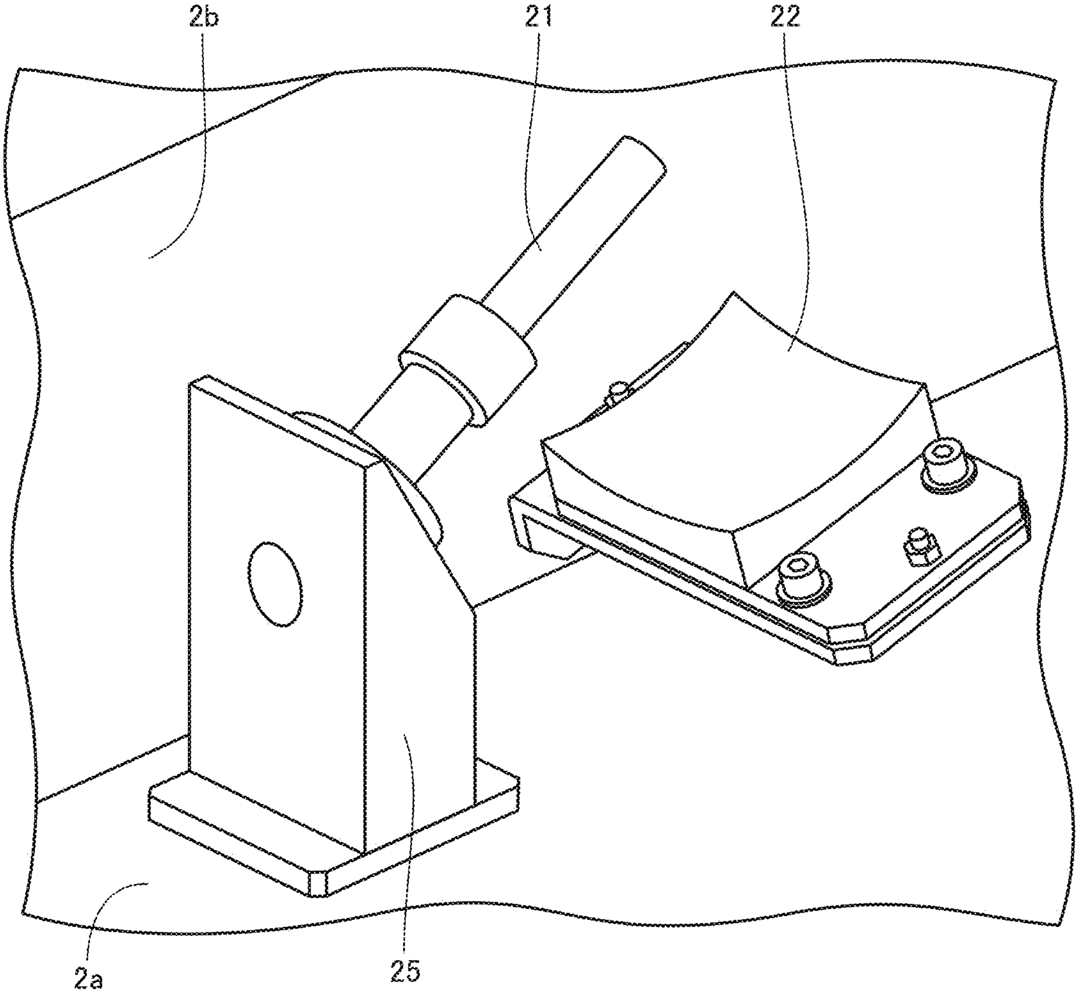
FIG. 5 is a perspective view for illustrating a light source unit of the Fourier transform infrared spectrophotometer according to the embodiment.
Figure 6:
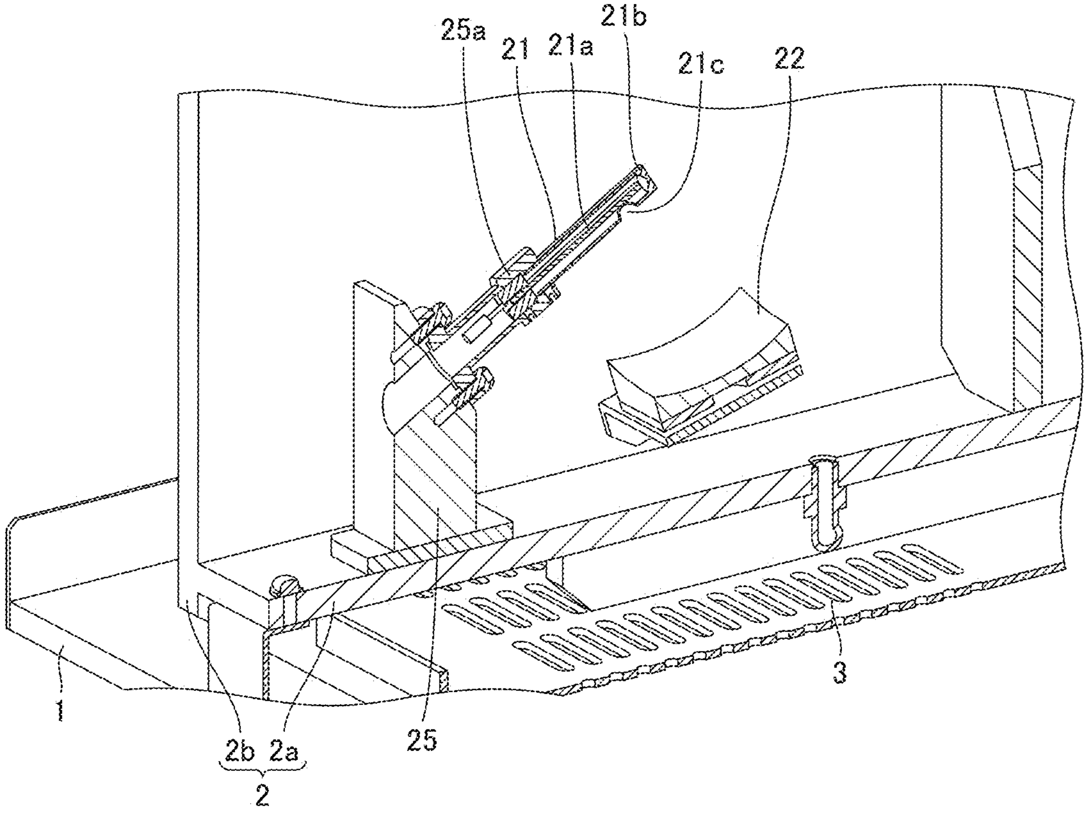
FIG. 6 is a cross-sectional view for illustrating the light source unit of the Fourier transform infrared spectrophotometer according to the embodiment.

The heat emitted from infrared light source 21 is described in more detail. FIG. 5 is a perspective view for illustrating the light source unit of Fourier transform infrared spectrophotometer 100 according to the embodiment. FIG. 6 is a cross-sectional view for illustrating the light source unit of Fourier transform infrared spectrophotometer 100 according to the embodiment. As shown in FIG. 5, infrared light source 21 is fixed to the upper surface of first portion 2*a* by holding block 25. Specifically, since infrared light source 21 irradiates condenser mirror 22 with infrared light, infrared light source 21 is disposed on first portion 2*a* at an angle at which the optical axis from infrared light source 21 and the upper surface of first portion 2*a* form an oblique angle.

Further, as shown in FIG. 6, infrared light source 21 includes a light emitting portion 21*a* that emits infrared light, and a cover 21*b* that covers light emitting portion 21*a*. Cover 21*b* is provided with a slit 21*c* that allows infrared light to be applied to condenser mirror 22. Light other than the infrared light emitted from slit 21*c* is trapped inside infrared light source 21 by cover 21*b*. Accordingly, heat is generated in infrared light source 21, resulting in increase of the temperature of infrared light source 21 itself, particularly the temperature of cover 21*b*.

In order to prevent heat generated from infrared light source 21 from being transferred to holding block 25, portions of holding block 25 that abut against infrared light source 21 are provided with a heat insulating member 25*a*. Specifically, infrared light source 21 is disposed on the upper surface of first portion 2*a* with heat insulating member 25*a* interposed between the infrared light source and the upper surface. Accordingly, heat generated from infrared light source 21 is prevented from being transferred to base plate 2 through holding block 25.

Even when holding block 25 is provided with heat insulating member 25*a*, a part of heat generated from infrared light source 21 is still transferred to base plate 2. Therefore, heat dissipation from first portion 2*a* is promoted, so that the heat transferred to first portion 2*a* of base plate 2 is not transferred to second portion 2*b* where interferometer 10 is located. Specifically, the upper surface of first portion 2*a* is constituted of a first region and a second region that border each other at the position where infrared light source 21 is located, where the first region is located on a side of second portion 2*b* and the second region is located on the opposite side to second portion 2*b*, and the area of the second region is larger than the area of the first region. Accordingly, first portion 2*a* includes the larger region located on the opposite side to second portion 2*b* where interferometer 10 is disposed, so that heat dissipation from this region can be promoted.

Figure 7:
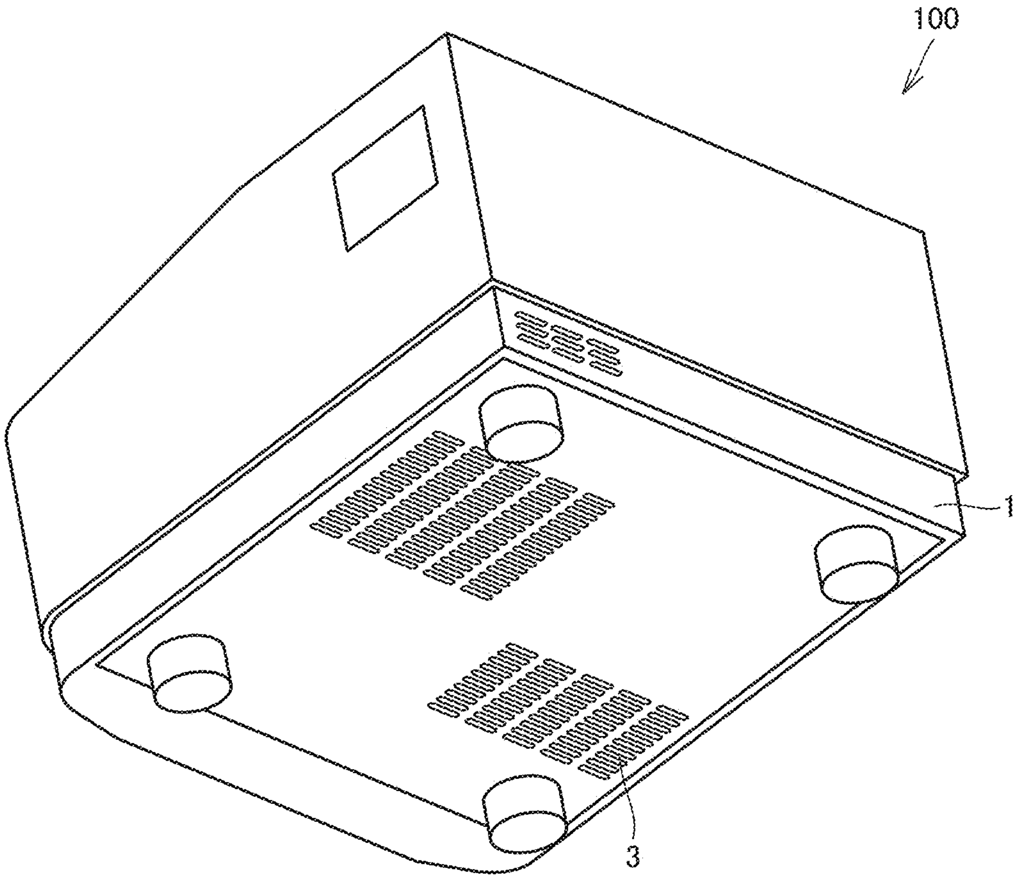
FIG. 7 is a bottom view for illustrating heat dissipation from the Fourier transform infrared spectrophotometer according to the embodiment.

Housing 1 located below first portion 2*a* is provided with an air window 3 so that heat from infrared light source 21 transferred to first portion 2*a* can be dissipated from the lower surface of first portion 2*a* to the outside of housing 1. FIG. 7 is a bottom view for illustrating heat dissipation from Fourier transform infrared spectrophotometer 100 according to the embodiment. As shown in FIG. 7, the bottom surface of housing 1 is provided with a plurality of air windows 3, and heat from infrared light source 21 can be dissipated efficiently from the lower surface of first portion 2*a*.

Aspects

The illustrative embodiment described above will be understood by those skilled in the art as a specific example of the following aspects.

(Clause 1) A Fourier transform infrared spectrophotometer according to one aspect includes: an infrared light source that emits infrared light; an interferometer that includes a beam splitter, a fixed mirror, and a moving mirror, and generates interference light from the infrared light; and a base plate including a first portion where the infrared light source is located and a second portion where the interferometer is located, wherein the base plate has a shape forming a predetermined angle between the first portion and the second portion.

Thus, the Fourier transform infrared spectrophotometer of the present disclosure is configured to enable hindrance, to a greater extent, of heat transfer from the infrared light source to the interferometer. Moreover, the base plate is shaped to form a predetermined angle between the first portion and the second portion, to enable three-dimensional arrangement of the infrared light source and the interferometer, which provides a higher degree of freedom of the arrangement of the infrared light source and the interferometer, and can therefore contribute to further compactness of the Fourier transform infrared spectrometer.

(Clause 2) The Fourier transform infrared spectrophotometer according to Clause 1, wherein the first portion and the second portion of the base plate form an L shape.

Thus, the interferometer can be disposed on the second portion vertically, so that the Fourier transform infrared spectrophotometer can be made further compact, while blocking heat from the infrared light source by means of the second portion of the base plate.

(Clause 3) The Fourier transform infrared spectrophotometer according to Clause 1 or 2, wherein the base plate has a one-piece structure into which the first portion and the second portion are integrated.

Thus, the positional accuracy of the infrared light source and the interferometer can be enhanced, and the necessary infrared interference light can be generated by the infrared light source and the interferometer.

(Clause 4) The Fourier transform infrared spectrophotometer according to any one of Clauses 1 to 3, wherein the infrared light source is located on the first portion with a heat insulating member interposed between the infrared light source and the first portion.

Thus, heat generated from the infrared light source can be trapped within the infrared light source, so that heat leaked to the first portion of the base plate can be reduced.

(Clause 5) The Fourier transform infrared spectrophotometer according to any one of Clauses 1 to 4, wherein the first portion of the base plate is constituted of a first region and a second region that border each other at a position where the infrared light source is located, the first region being located on a side of the second portion, and the second region being located on an opposite side to the second portion, and the second region has a larger area than an area of the first region.

Thus, for the heat from the infrared light source transferred to the first portion of the base plate, heat dissipation from the second region having a larger area can be promoted to reduce a temperature change of the interferometer.

(Clause 6) The Fourier transform infrared spectrophotometer according to any one of Clauses 1 to 5, wherein the base plate holds the infrared light source at an oblique angle formed between an optical axis from the infrared light source and an upper surface of the first portion of the base plate.

Thus, the light from the infrared light source is reflected from the condenser mirror so that the light can be introduced efficiently into the interferometer by the collimator mirror located above the condenser mirror.

(Clause 7) The Fourier transform infrared spectrophotometer according to any one of Clauses 1 to 6 further includes a cover member covering the interferometer.

Thus, the air tightness for the interferometer can be ensured, and the humidity in the cover member can be controlled to protect deliquescent optical components such as beam splitter.

(Clause 8) The Fourier transform infrared spectrophotometer according to Clause 7 allows the cover member to be made from a resin material.

Thus, the cover member can be made from the resin material to reduce the weight of the Fourier transform infrared spectrophotometer.

It should be construed that the embodiment and its modifications disclosed herein are given by way of illustration in all respects, not by way of limitation. It is intended that the scope of the present invention is defined by claims, not by the description above, and encompasses all variations equivalent in meaning and scope to the claims.

REFERENCE SIGNS LIST

1 housing; 2 base plate; 2*a* first portion; 2*b* second portion; 3 air window; 4 window; 5 cover member; 10 interferometer; 11 beam splitter; 12 fixed mirror; 13 moving mirror; 14, 15 mirror; 16, 52 photodetector; 20 light source unit; 21 infrared light source; 21*a* light emitting portion; 21*b* cover; 21*c* slit; 22 condenser mirror; 23 collimator mirror; 24 laser light source; 25 holding block; 25*a* heat insulating member; 30 circuit unit; 31 controller; 32 signal generator; 33 amplifier; 36 data processor; 40 sample chamber; 41 sample; 42 parabolic mirror, 50 detection unit; 51 ellipsoidal mirror; 100 Fourier transform infrared spectrophotometer

The invention claimed is:

1. A Fourier transform infrared spectrophotometer comprising:

an infrared light source that emits infrared light;

an interferometer that includes a beam splitter, a fixed mirror, and a moving mirror, and generates interference light from the infrared light; and a base plate including a first portion where the infrared light source is located and a second portion where the interferometer is located, wherein the base plate has a shape forming a predetermined angle between the first portion and the second portion; and a first space in which the infrared light source is located on the first portion and a second space in which the interferometer is located on the second portion are separated by the base plate;

the second portion having an inner surface abutting against the first portion and an outer surface opposite to the inner surface; and the interferometer is disposed on the outer surface of the second portion.

2. The Fourier transform infrared spectrophotometer according to claim 1, wherein the first portion and the second portion of the base plate form an L shape.

3. The Fourier transform infrared spectrophotometer according to claim 1, wherein the base plate has a one-piece structure into which the first portion and the second portion are integrated.

4. The Fourier transform infrared spectrophotometer according to claim 1, wherein the first portion of the base plate is constituted of a first region and a second region that border each other at a position where the infrared light source is located, the first region being located on a side of the second portion, and the second region being located on an opposite side to the second portion, and the second region has a larger area than an area of the first region.

5. The Fourier transform infrared spectrophotometer according to claim 1, wherein the base plate holds the infrared light source at an oblique angle formed between an optical axis from the infrared light source and an upper surface of the first portion of the base plate.

6. The Fourier transform infrared spectrophotometer according to claim 1, further comprising a cover member covering the interferometer.

7. The Fourier transform infrared spectrophotometer according to claim 6, wherein the cover member is made from a resin material.

* * * * *